April 19, 1932.  C. S. BRAGG ET AL  1,854,367

POWER ACTUATOR

Original Filed April 16, 1925

Patented Apr. 19, 1932

1,854,367

UNITED STATES PATENT OFFICE

CALEB S. BRAGG, OF PALM BEACH, FLORIDA, AND VICTOR W. KLIESRATH, OF PORT WASHINGTON, NEW YORK, ASSIGNORS TO BRAGG-KLIESRATH CORPORATION, OF LONG ISLAND CITY, NEW YORK, A CORPORATION OF NEW YORK

POWER ACTUATOR

Original application filed April 16, 1925, Serial No. 23,459. Divided and this application filed November 13, 1926. Serial No. 148,158.

Our invention consists in the novel features hereinafter described, reference being had to the accompanying drawings which show an embodiment of our invention selected by us for purposes of illustration, and the said invention is fully disclosed in the following description and claims.

Our invention is an improvement in power actuators adapted to be operated by differential pressures under the control of suitable valve mechanism, and our actuator is especially adapted to installations in which a continuously circulating liquid, as oil for example, circulated by a suitable pump is employed for operating the actuator and is a division of our copending application, Serial No. 23,459, filed April 16, 1925.

In accordance with our present invention, the actuator comprises a cylinder closed at both ends, a double acting piston in the cylinder provided with a valve chamber and ports communicating with the cylinder on opposite sides of the piston, and a piston valve in the valve chamber movable with and with respect to the piston, and provided with an outlet or suction chamber connected with the suction side of the pump and with cylindrical valve portions on opposite sides of the outlet or suction chamber, means being provided for connecting the opposite ends of the valve chamber with the pressure side of the pump, said cylindrical portions of the valve being so disposed with relation to the ports that when the valve is in its neutral position both of said ports will communicate not only with the suction side of the pump, but with the pressure side directly connecting the high and low pressure source, and permitting a continual circulation of the pressure liquid, while a movement of the valve in either direction longitudinally would cause the pressure liquid to accumulate on one side of the piston and be withdrawn from the cylinder on the opposite side, producing a movement of the piston in one direction or the other.

Our invention also includes operator operated means for the valve, means for arresting the piston and the valve when the piston is in normal or off position so as to hold the valve in its neutral position, and means for connecting the piston with the part to be actuated, the construction also providing means for enabling the operator, by taking up the lost motion between the valve actuating means and the piston in either direction, limited by the extent of movement of the valve in the valve chamber or otherwise, to apply his physical power to the piston and the part to be operated in addition to the power of the actuator, or in case of failure of power.

Our invention also consists in the novel features of construction and combination illustrated in the drawings and hereinafter described, and particularly pointed out in the claims, and is especially desirable for use in operating brake mechanism and other mechanisms in automotive vehicles of various kinds, and for operating control mechanism for aeroplanes and the like.

Referring to the drawings.

Figure 2:
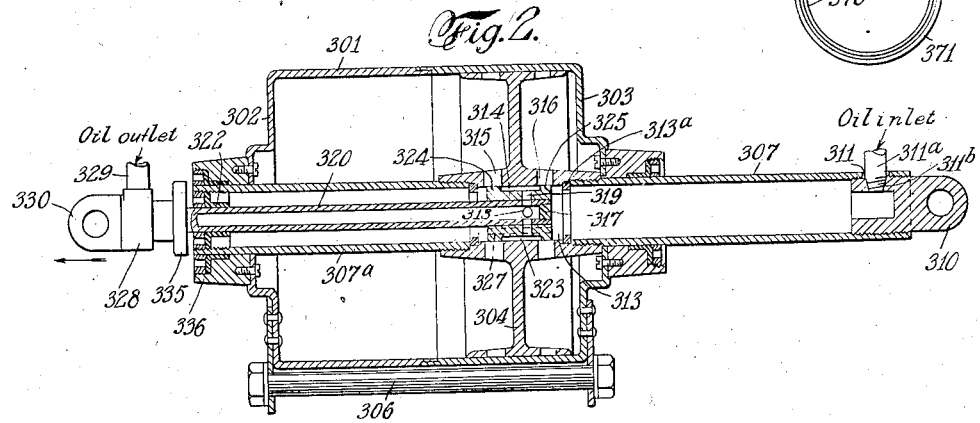
Fig. 2 is an enlarged sectional view of the actuator showing the valve mechanism constructed to permit the free circulation of pressure liquid around the valve in the neutral position.

Referring to the form of actuator shown in Fig. 2, 301 represents the cylinder closed at both ends by heads, 302 and 303, and provided with a double acting piston, 304, provided with two hollow piston rods, 307 and 307ª, extending through suitable stuffing boxes in the heads of the cylinder, which in this instance is shown as a forging or stamping formed in two parts and held in operative relation by bolts, 306. In this instance the outer end of the hollow piston rod, 307, is provided with an attaching lug, 310, for attaching it to the part to be operated and with an inlet aperture, 311, which we term the higher pressure inlet, to which the inlet pipe, 311ª, is connected. The hub of the piston is provided with a cylindrical valve chamber, 313, between the hollow piston rods, in which is located the reversing piston valve, 314. The piston hub is provided with ports, 315 and 316, for establishing communication between the valve chamber and the cylinder on opposite sides of the piston respectively. The valve, 314, is provided with cylindrical portions, 324 and 325, so disposed with relation to the ports, 315 and 316, that when the valve is in neutral, or in the normal or off position, both of said ports will be opened and not only communicate with the outlet or suction chamber, 323, but said ports will communicate with the interior of the hollow pistons. The piston valve is secured to a valve actuating sleeve, 320, which extends through a stuffing box, 322, in the outer end of the piston rod, 307ª, and the interior of the said sleeve communicates with a fluid outlet pipe, 329, at its outer end, exterior to the cylinder. The sleeve, 320, is provided within the cylinder and within the valve with an outlet aperture, 318, communicating by passages, 319, in the valve with the outlet chamber, 323. The valve is also provided in this instance with one or more longitudinal passages, one of which is indicated in dotted lines at 327, for connecting the opposite ends of the valve chamber, 313, so that both ends thereof are in communication with the oil inlet pipe, 311ª. The cylindrical portions, 324 and 325, are in this instance slightly narrower than the ports, 315 and 316 respectively, and in the neutral position of the valve illustrated in Fig. 2, the cylindrical portions occupy central positions with respect to the ports, so as to connect each port with the outlet chamber, 323, and also with the adjacent end of the valve chamber, 313. Therefore, the high and low pressure sources are directly connected. The valve sleeve in this instance is closed at its inner end by a plug, 317, and is provided at its outer end with a fitting, 328, to which the suction pipe, 329, of the circulating oil system is connected, and said fitting is provided with an ear or ears, 330, connected to the operator operated part. The piston rod, 307ª, is preferably constructed so that it may pass into the hub or boss, 336, of the cylinder head, 302, and the sleeve, 320, is provided with a stop collar, 335, adjustably mounted thereon, for engaging the end of the boss, 336, to limit and determine the position of the valve when the piston is in the normal or off position, in which it is arrested by the engagement of the hub of the piston with the head, 303, of the cylinder, as shown in Fig. 2. The stop collar, 335, on the sleeve being so adjusted as to arrest the valve in its neutral position when the piston is in the normal or off position.

Figure 1:
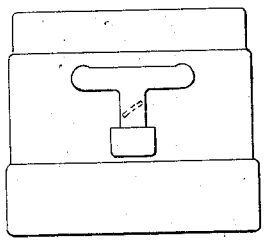
Fig. 1 is a diagrammatic view illustrating our improved actuator installed in an automotive vehicle for operating the brake mechanism thereof.
Figure 1:
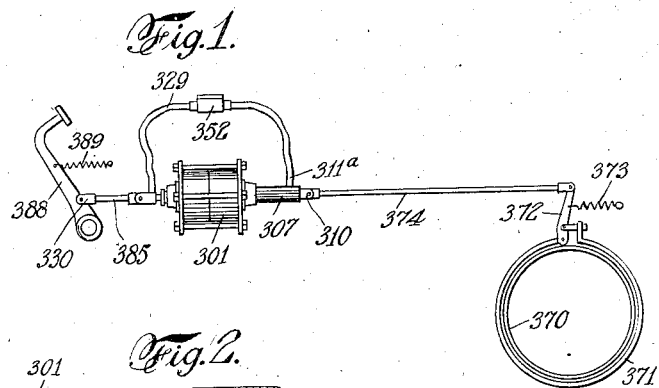

In Fig. 1 we have shown diagrammatically an installation in an automotive vehicle for operating the brake mechanism thereof. The brake mechanism is diagrammatically illustrated by a brake drum, 370, and brake band, 371, connected with a brake applying lever, 372, having the usual retracting spring, 373, and connected by a link rod, 374, with the piston rod, 307. The valve actuating sleeve, 320, is connected by a link, 385, with a foot lever, 388, provided with the usual retracting spring, 389. 352 represents a continuously operating circulating oil pump having its suction side connected with the pipe, 329, a portion of which is flexible to accommodate the longitudinal movement of the valve sleeve, and the pressure side of the pump is connected with the pressure pipe, 311ª, a portion of which is also made flexible to accommodate the longitudinal movement of the piston and piston rod, 307, the oil circulating system being somewhat similar to that described in our former application for Letters Patent of the United States, Serial No. 15,460, filed March 14, 1925.

Assuming that the cylinder is filled with oil on both sides of the piston, and that the piston rods, valve sleeve, oil inlet, and oil eduction pipes are likewise filled with oil, which is being continuously circulated by the pump, 352, and the parts being in the normal position illustrated in Fig. 2, for example, the oil will pass through the piston rod, 307, and be by-passed around the cylindrical portion, 325, of the valve to the outlet or suction chamber 323, thence out through the valve sleeve, 320, and suction pipe, 329, thus permitting a free circulation of the oil. If the valve sleeve, 320, is moved in the direction of the arrow in Fig. 2, the valve, 314, will be correspondingly moved so as to cut off the ports, 316, from the suction chamber, 323, and bringing the suction chamber more fully into communication with the ports, 315. The incoming oil will then pass through the ports, 316, and accumulate pressure behind the piston while the oil in the cylinder forward of the piston will be withdrawn by the suction of the pump through the ports, 315, outlet or suction chamber, 323, sleeve, 320, and outlet or suction pipe, 329. This will cause the piston to move in the direction of the arrow and the movement will continue as long as the movement of the valve actuating sleeve continues. When the valve sleeve stops the movement of the piston will continue with respect to the valve and bring the valves into such a position as to maintain sufficient pressure behind the piston to balance the load of the brakes, or other actuated part. When the valve sleeve, 320, is moved in a direction opposite that indicated by the arrow, the outlet or suction chamber, 323, of the valve will be placed in communication with the ports, 316, thereby withdrawing oil in rear of the piston and the incoming oil from the pipe, 311ª, will pass through the by-pass or passage, 327, of the valve to the forward side of the valve, and thence through ports, 315, to the cylinder forward of the piston and effect a return movement of the piston and the release of the brakes. Just before the piston comes to rest with its hub against the head, 303, of the cylinder, the stop collar, 335, on sleeve, 320, will engage the boss, 336, on the cylinder head, 302, thus arresting the sleeve and valve, sufficiently to restore the valve to the neutral and normal position indicated in Fig. 2, and thus by-passing the oil around the cylindrical portion, 325, of the valve, and out through the suction pipe, 329, to the pump, as previously described.

There is a limited amount of lost motion between the valve sleeve and the piston, so that if the valve sleeve is moved in either direction so as to take up this lost motion, the piston may be actuated by the sleeve. The lost motion may be limited by the valve itself, or other means may be provided if it is preferred to avoid placing this strain on the valve. In the form shown in Fig. 2, the lost motion is limited by the valve itself coming in contact with a collar, 313ª, at either end of the valve chamber, 313, said collars being held in position as shown in this instance by the hollow piston rods which are screwed into the opposite ends of the piston hub. It follows from this construction that when the brake mechanism has been actuated to the fullest extent, the operator can by moving the pedal or other manually operated device so as to take up the lost motion between the sleeve and piston, add his physical force to the power of the actuator in the application of the brakes, and in the same manner he may in case of failure of power for any reason apply force to the operator operated part to move the valve sleeve, 320, in the direction of the arrow in Fig. 2, thereby placing the valve in proper position to vent the cylinder, taking up the lost motion between the piston and the valve actuating sleeve, and positively moving the piston forward to apply the brakes. Obviously when the brake pedal is released the retracting spring will force the valve sleeve in the opposite direction and vent the cylinder for the return movement of the piston, which would be effected by the load of the brakes and the retracting mechanism thereof, where the device is used in connection with brake mechanisms. In other connections the piston can likewise be forced rearwardly by the operator operated part when the valve sleeve is moved in a direction opposite that of the arrow in Fig. 2, far enough to take up the lost motion.

Figure 3:
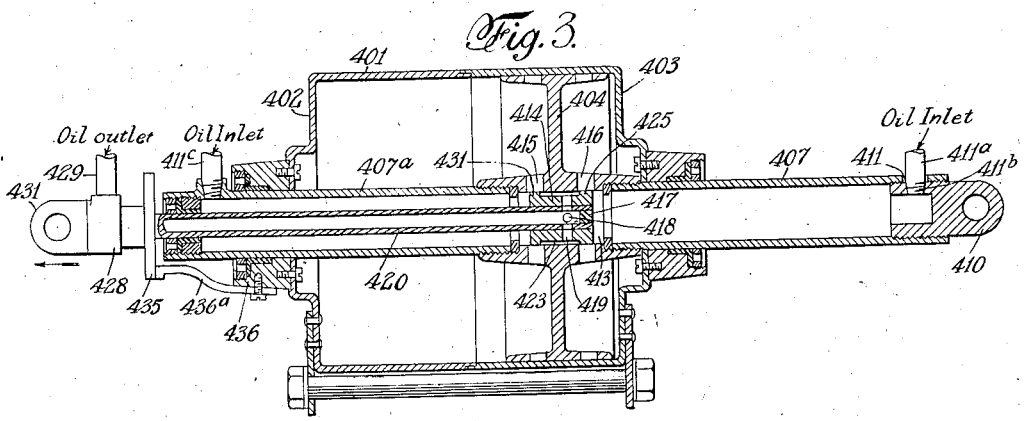
Fig. 3 is a view similar to Fig. 2 showing a slightly modified form.
Figure 4:
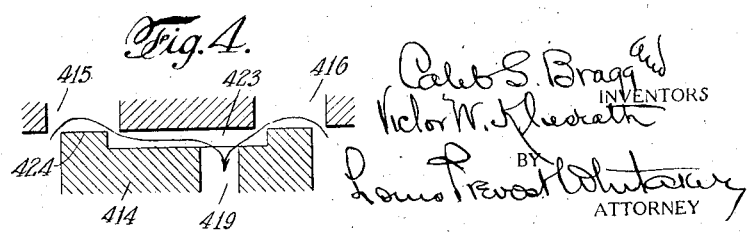
Fig. 4 is an enlarged detail view illustrating the relation of the valve when in neutral or normal position with the piston ports, in the form of actuator illustrated in Figs. 2 and 3.

In Fig. 3 we have illustrated a slight modification of the construction illustrated in Fig. 2, in which the operation is precisely the same as that described with reference to Fig. 2, except that the by-pass passage, or passages, 327, of Fig. 2, in the valve, are omitted and the oil is admitted at both ends of the valve chamber through the respective piston rods. In Figs. 3, the parts corresponding to those previously described with respect to Fig. 2 are given the same numerals with the addition of 100, and as to those parts which are identical with those shown in Fig. 2, they need not be again described. In this instance the piston rod, 407, is provided with oil inlet pipe, 411ª, and the piston rod, 407ª, is provided with a branch oil inlet pipe, indicated at 411ᶜ, so that oil is supplied to either end of the valve chamber, 413, as required by the position of the valve, 414. The oil is withdrawn through the outlet or suction chamber, 423, of the valve, and through the valve actuating sleeve, 420, and outlet or suction pipe, 429. As the presence of the oil inlet pipe, 411ᶜ, prevents the possibility of the piston rod, 407ª, passing into the hub of the head, 402, so as to permit the stop collar, 435, on on the sleeve to engage said hub, 436, the hub, 436, is provided with a bracket, 436ª, to engage the stop collar, 435, on the sleeve, 420, to arrest the sleeve on the return movement of the parts to normal or retracted position, so that the valve will be held in neutral position and permit the by-passing of the oil around the cylindrical portions, 424 and 425, of the valve from the inlet pipes, 411ᶜ, and 411ª, through the valve chamber, 413, to the outlet or suction chamber, 423. After the piston has been actuated, in the manner previously described with reference to Fig. 2, and it is desired to return the piston to its normal or off position, the reversed movement of the valve sleeve, 420, will move the valve so as to bring the suction chamber, 423, into communication with the ports, 416, and at the same time to bring the ports, 415, in communication with the forward end of the valve chamber, 413, thus withdrawing the oil from the cylinder in rear of the piston, and permitting the oil under pressure from the pump to enter through the pipe, 411ᶜ, and be delivered to the cylinder forward of the piston to effect the rearward movement of the piston. The operation otherwise is exactly as previously described, and the valve sleeve will be arrested by the bracket, 436ª, and stop collar, 435, so that the piston comes to rest with its hub against the head, 403, of the cylinder, the valve will be in the position shown in Fig. 3, and permitting the by-passing of the oil through the apparatus without effecting any operation thereof.

Where the actuator is operated by a continually circulating pressure liquid, we prefer to employ castor oil, as this is not injurious to the packings, which we prefer to make of rubber, as hereinbefore stated, but it is obvious that other liquids could be employed and that the packings may be made of other materials than rubber, if this should be or become necessary.

It will be noted that in operating a power actuator embodying our present invention no tank or reservoir for the fluid or circulating fluid medium is necessary, and no external by-pass to accommodate the fluid when the piston is not operating, as the fluid entering the cylinder passes out again, and is not merely by-passed around the controlling valve within the controlling valve chamber. This greatly simplifies the construction. It is also to be noted that no pressure is built up in the circulating medium when the actuator is not in operation beyond that required to circulate or move the fluid, and this is particularly important where a circulating pump is employed to circulate the fluid medium, as there is practically no appreciable pressure in the circulating system when the valve is in neutral position, and as the waste of power which would be required to maintain the fluid continuously under pressure is avoided. In employing our invention, the pressure is only accumulated when and as needed to move the piston and the parts connected therewith.

What we claim and desire to secure by Letters Patent is:—

1. In a power actuator, the combination of a cylinder closed at both ends, a double acting piston in said cylinder provided with a cylindrical valve chamber, and with ports connecting said valve chamber with the end portions of the cylinders on both sides of the piston, a reversing piston valve in said valve chamber, provided with cylindrical valve portions adapted to be brought into substantial registration with said ports and having an outlet chamber intermediate said cylindrical valve portions, adapted to be brought into substantial registration with the ports for one or other of the end portions of the cylinder, a unidirectional liquid circulating device, means for connecting the piston with the part to be actuated, a valve sleeve extending through one end of the cylinder, and connected with said valve for operating the same, the interior of said sleeve being in communication with the said outlet chamber of the reversing valve, and with the low pressure side of said unidirectional circulating device, said sleeve being provided with means for connecting it to an operator operated part, and means for admitting a current of fluid from the high pressure side of said circulating device to the end portions of the valve chamber, at the opposite ends of said reversing piston valve, the cylindrical valve portions being so located with respect to the piston ports on opposite sides of the piston as to leave said ports open on both sides of each of said cylindrical valve portions to permit the said fluid to pass around either of said cylindrical portions to said outlet chamber, without appreciable pressure, when the valve is in central position.

2. In an automotive vehicle, provided with brake mechanism, the combination with a power actuator comprising a cylinder closed at both ends, a double acting piston in said cylinder provided with a hollow piston rod extending through one end of the cylinder, and a valve chamber in the piston communicating at one end with the hollow piston rod, and ports connecting said valve chamber with the cylinder on opposite sides of the piston, of a longitudinally movable piston valve in said valve chamber, provided with cylindrical valve portions adapted to be brought simultaneously into substantial registration with said ports when the valve is in neutral position, and having an outlet chamber between said cylindrical portions, said ports and cylindrical valve portions being constructed so as to place each port in communication with the outlet chamber, and with the end portions of the valve chamber, when the valve is in neutral position, to permit unidirectional passage of the liquid therethrough without appreciable pressure, a valve actuating sleeve extending through the valve and secured thereto, and communicating with said outlet chamber, a continuously operating liquid circulating pump, a suction pipe connecting the suction side of said pump with the said sleeve, a pressure pipe connecting the pressure side of said pump with said hollow piston rod, means for connecting the pressure side of the pump with the other end of said valve chamber, means for connecting the piston rod with the brake mechanism, and an operator operated part connected with the valve actuating sleeve.

3. In an automotive vehicle, provided with brake mechanism, the combination with a power actuator comprising a cylinder closed at both ends, a double acting piston in said cylinder provided with hollow piston rods extending through opposite ends of the cylinder, and a valve chamber in the piston communicating at one end with one of the hollow piston rods, and ports connecting said valve chamber with the cylinder on opposite sides of the piston, of a longitudinally movable piston valve in said valve chamber, provided with cylindrical valve portions adapted to be brought simultaneously into substantial registration with said ports when the valve is in neutral position, and having an outlet chamber between said cylindrical portions, said ports and cylindrical valve portions being constructed so as to place each port in communication with the end portions of outlet chamber and with the end portions of the valve chamber, a valve actuating sleeve extending through one of the piston rods and through the valve and secured thereto, and communicating with said outlet chamber, a continuously operating liquid circulating pump, a suction pipe connecting the suction side of said pump with the said sleeve, a pressure pipe connecting the pressure side of said pump with said hollow piston rod, means for connecting the pressure side of the pump with the other end of said valve chamber, means for connecting one of the piston rods with the brake mechanism, and an operator operated part connected with the valve actuating sleeve, said piston and valve actuating sleeve being provided with means for limiting the lost motion between them, to permit the operator to apply his physical force to the piston in addition to the power of the actuator, or in case of failure of power.

In testimony whereof we affix our signatures.

CALEB S. BRAGG.
VICTOR W. KLIESRATH.